United States Patent [19]

Shibuya et al.

[11] Patent Number: 5,205,950

[45] Date of Patent: Apr. 27, 1993

[54] PROCESS FOR PREPARING IRON CARBIDE FINE PARTICLES

[75] Inventors: Yoshiyuki Shibuya; Naoki Miyamoto; Shigeo Daimon, all of Settsu, Japan

[73] Assignee: Daikin Industries, Ltd., Osaka, Japan

[21] Appl. No.: 723,887

[22] Filed: Jul. 1, 1991

[30] Foreign Application Priority Data

Jul. 2, 1990 [JP] Japan .................................. 2-175819

[51] Int. Cl.$^5$ ......................... C01B 31/30; C01B 35/56
[52] U.S. Cl. .................................. 252/62.51; 423/439
[58] Field of Search ................. 423/440, 439; 501/87; 252/62.55, 62.51, 62.56, 62.58, 62.59; 106/456

[56] References Cited

U.S. PATENT DOCUMENTS

| | | | |
|---|---|---|---|
| 4,668,414 | 5/1987 | Okamura et al. | 423/439 |
| 4,900,464 | 2/1990 | Arase et al. | 423/439 |
| 4,931,198 | 6/1990 | Arase et al. | 423/439 |

FOREIGN PATENT DOCUMENTS

| | | | |
|---|---|---|---|
| 123318 | 10/1984 | European Pat. Off. | 423/439 |
| 312032 | 4/1989 | European Pat. Off. | 423/439 |
| 326165 | 8/1989 | European Pat. Off. | |

OTHER PUBLICATIONS

*Webster's New International Dictionary*, 2d Ed., G & C Merriam Co., 1959, p. 2884.

Primary Examiner—Gary P. Straub
Assistant Examiner—Stephen G. Kalinchak
Attorney, Agent, or Firm—Nikaido, Marmelstein, Murray & Oram

[57] ABSTRACT

The present invention provides a process for preparing iron carbide fine particles having an average particle size (long axis) of 0.1 to 2 μm and an average axial ratio of 3 to 20, which comprises, (a) optionally contacting an iron compound selected from the group consisting of iron oxyhydroxide fine particles and iron oxide fine particles with a reducing agent which does not contain carbon atom, the iron compound being, prior to the above contact, coated with iron compound or iron compound and cobalt compound, and with aluminum compound or silicon compound, and (b) contacting the iron compound of the above (a) with a reducing-and-carburizing agent containing carbon atom or a mixture thereof with a reducing agent which does not contain carbon atom.

14 Claims, No Drawings

PROCESS FOR PREPARING IRON CARBIDE FINE PARTICLES

The present invention relates to a process for preparing iron carbide fine particles.

It is known that acicular particles containing iron carbide are prepared by contacting acicular iron oxyhydroxide or acicular iron oxide with CO or a mixture of CO and $H_2$ at 250° to 400° C. and that the resulting particles are stable chemically, have a high coercive force and are useful as a magnetic material for magnetic recording media. (For example, refer to JP-B-1-43683, JP-A-60-108309, JP-B-1-35772 and JP-A-60-155522. The term "JP-B" as used herein means an "examined published Japanese patent application" and "JP-A" as used herein means an "unexamined published Japanese patent application".)

Since iron carbide fine particles are generally used as a coating-type magnetic recording medium, they are required to have characteristics as a coating material like a pigment. However, iron carbide fine particles would be sintered or deformed during reduction or carburizing step. Therefore, the starting particles are coated with a silicon compound or aluminum compound and then reduced and carburized. Although the particles are prevented from being sintered or deformed, a large amount of carbon deposits on the resulting particles to cause deterioration of their magnetic characteristics.

JP-A-1-192713 (U.S. Ser. No. 302,636) discloses a process for preparing iron carbide fine particles which have less deterioration of their magnetic characteristics. In this process, iron carbide fine particles are obtained by contacting at 250° to 400° C. an iron compound selected from the group consisting of iron oxyhydroxide fine particles and iron oxide fine particles with a reducing-and-carburizing agent containing carbon atom such as CO, the iron compound being, prior to the above contact, coated with nickel compound, copper compound, or manganese compound and then coated with a silicon compound or aluminum compound. By this process, there are obtained fine particles which are improved in coercive force and saturation magnetization.

However, it is still desired to obtain fine particles having more improved magnetic characteristics. As between coercive force and saturation magnetization, since the former has to be adjusted to the capacity of a magnetic head and is restricted to the existing magnetic head, improvement of the latter characteristic is especially desired. The larger the saturation magnetization, the greater is the magnetic recording capacity, without being restricted by the capacity of the magnetic head, and thus will achieve high recording density and power.

An object of the invention is to provide a process for preparing iron carbide fine particles, which are subject to low deposition of free carbon on the resulting iron carbide particles, and are high in saturation magnetization.

The above and other objects of the invention will become apparent from the following description.

The present invention provides a process for preparing iron carbide fine particles having an average particle size (long axis) of 0.1 to 2 $\mu$m and an average axial ratio of 3 to 20, which comprises, (a) optionally contacting an iron compound selected from the group consisting of iron oxyhydroxide fine particles and iron oxide fine particles with a reducing agent which does not contain carbon atom, the iron compound being, prior to the above contact, coated with an iron compound or an iron compound and a cobalt compound, and with an aluminum compound or silicon compound, and (b) contacting the iron compound of the above step (a) with a reducing-and-carburizing agent containing carbon atom, or a mixture thereof with a reducing agent, which does not contain carbon atom.

It is presumed that the aluminum compound or the silicon compound, which is added to stabilize the shape of the starting iron compound, acts as a catalyst for depositing carbon during the reduction with CO. In the present invention, it is found that the iron compound or the cobalt compound is effective to prevent the above described deposition of carbon.

Examples of preferred iron oxyhydroxides are $\alpha$-FeOOH (goethite), $\beta$-FeOOH (akaganite) and $\gamma$-FeOOH (lepidocrosite). Examples of preferred iron oxides are $\alpha$-$Fe_2O_3$ (hematite), $\gamma$-$Fe_2O_3$ (maghemite) and $Fe_3O_4$ (magnetite).

$\alpha$-$Fe_2O_3$ or $\gamma$-$Fe_2O_3$ is, for example, one prepared by heating $\alpha$-FeOOH, $\beta$-FeOOH or $\gamma$-FeOOH at about 200° to about 350° C., followed by dehydrating it, $\alpha$-$Fe_2O_3$ or $\gamma$-$Fe_2O_3$ prepared by heating the resulting product further at about 350° to about 900° C. to compact the crystals, and others. $\beta$-FeOOH is preferably treated with an aqueous solution of alkaline compound.

The above-mentioned $Fe_3O_4$ can be prepared by contacting an iron oxide other than $Fe_3O_4$ or iron oxyhydroxide with a reducing-and-carburizing agent containing carbon atom or a reducing agent which does not contain carbon atom, or a mixture thereof, although the $Fe_3O_4$ is not limited to one prepared in those methods. When a reducing-and-carburizing agent containing carbon atom or a mixture thereof with a reducing agent which does not contain carbon atom, is contacted with an iron oxyhydroxide or iron oxide other than $Fe_3O_4$ to prepare $Fe_3O_4$, the same contact conditions as those in the process (b) of the invention can also be employed except for the time condition. In this case, the $Fe_3O_4$ formed can be subsequently held in contact with the gas under the same conditions as in the preceding reaction without any interruption to obtain the desired particles of the invention.

The starting iron oxyhydroxides or iron oxides can be those at least 3, preferably 3 to 20, in average axial ratio and having an average particle size (long axis) of up to 2 $\mu$m, preferably 0.1 to 2 $\mu$m, most preferably 0.1 to 1.0 $\mu$m. As will be described later, the particles produced are slightly smaller than, but almost unchanged from, the starting material in average axial ratio and in average particle size, so that the particles of the invention in general preferably have such sizes.

The iron oxyhydroxide or iron oxide to be used as a starting material in the process for producing particles of the invention may contain a small amount, or small amounts, of a compound, such as oxide or carbonate of copper, magnesium, manganese or nickel; silicon oxide, potassium salt, sodium salt, etc., which are added when preparing the iron oxyhydroxide or iron oxide, so long as the starting material chiefly comprises an iron oxyhydroxide or iron oxide.

The starting iron oxyhydroxide preferably has a pH of at least 5 on the surface thereof as disclosed in JP-A-

60-108309. In this case particles are produced, having a higher coercive force. The starting iron oxyhydroxide having a pH of less than 5 can be used after the pH has been increased to at least 5 by contacting such with an aqueous solution of an alkali compound (e.g., sodium hydroxide, potassium hydroxide, ammonium hydroxide). Further, alkali-treated iron oxide can also be used. The starting material can be treated with an alkaline compound by contacting the material with an aqueous solution of sodium hydroxide, potassium hydroxide, ammonium hydroxide and like alkaline compound (e.g., with an aqueous solution having a pH of at least 8, preferably at least 10), stirring for 30 minutes to 1 hour when required, filtering the mixture and drying.

In the present invention, the surface pH is defined as a value which is obtained by boiling 5 g of a sample in 100 cc of distilled water for one hour, cooling the solution to room temperature, allowing it to stand for one hour, and measuring a pH of the resulting supernatant with a pH meter.

In the present invention, the particles of the above iron oxyhydroxide or iron oxide (hereinafter both compounds may be referred to as "starting iron compound") are coated with an iron compound or an iron compound and a cobalt compound, and with an aluminum compound and a silicon compound. According to this invention, the coating iron compound is different from the iron oxide or iron oxyhydroxide compounds of the starting particles.

Examples of iron compounds are iron chloride, iron nitrate and iron sulfate. Cobalt compounds include cobalt chloride, cobalt nitrate and cobalt sulfate.

Further, examples of silicon compounds are sodium orthosilicate, sodium metasilicate, potassium metasilicate and water glass, which includes various compositions. Aluminum compounds include aluminum sulfate, aluminum nitrate, aluminum chloride, various aluminum alums, sodium aluminate and potassium aluminate.

Each of those metal compounds can be coated on the surface of the starting iron compound, for example, by adding an aqueous solution of the above compound to a dispersion of the starting iron compound and then neutralizing the mixture. The amount for coating of each of the metal compounds is 0.01 to 10% by weight in terms of the metal element based on the weight of the iron oxyhydroxide or iron oxide in terms of $Fe_2O_3$.

Then the fine particles of the obtained starting iron compound are subjected to a contact reaction.

In the invention, typical examples of reducing agents which do not contain carbon atoms are $H_2$, $NH_2NH_2$, etc.

As the reducing-and-carburizing agent containing carbon atom, at least one of the following compounds can be used.

① CO
② aliphatic, linear or cyclic, saturated or unsaturated hydrocarbons such as methane, propane, butane, cyclohexane, methylcyclohexane, acetylene, ethylene, propylene, butadiene, isoprene, town gas, etc.
③ aromatic hydrocarbons such as benzene, toluene, xylene, alkylated or alkenylated derivatives thereof having a boiling point up to 150° C.
④ aliphatic alcohols such as methanol, ethanol, propanol, cyclohexanol, etc.
⑤ esters such as methyl formate, ethyl acetate and like ester having a boiling point up to 150° C.
⑥ ethers such as lower alkyl ether, vinyl ether and like ether having a boiling point up to 150° C.
⑦ aldehydes such as formaldehyde, acetaldehyde and like aldehyde having a boiling point up to 150° C.
⑧ ketones such as acetone, methyl ethly ketone, methyl isobutyl ketone and like ketone having a boiling point up to 150° C.

Particularly preferable reducing-and-carburizing agent containing carbon atoms are CO, $CH_3OH$, $HCOOCH_3$, and saturated or unsaturated aliphatic hydrocarbons having 1 to 5 carbon atoms.

In the process (a) of the invention, the reducing agent which does not contain carbon atoms can be used as it is or it can be diluted. Examples of diluents are $N_2$, $CO_2$, argon, helium, etc. The dilution ratio is suitably selected but is preferably up to about 10 times (by volume). The contacting temperature, contacting time, gas flow rate and other conditions depend, for example, on the production history, average axial ratio, average particle size and specific surface area of the starting iron compound. The preferred contacting temperature is about 200° to about 700° C., preferably about 300° to about 400° C. The preferred contacting time is about 0.5 to about 6 hours. The preferred gas flow rate (excluding diluent) is about 1 to about 1000 ml S.T.P./min per gram of the starting iron compound. The contacting pressure inclusive of that of the diluent is usually 1 to 2 atm. although not particularly limitative.

In the process (b) of the invention, the reducing-and-carburizing agent containing carbon atoms, or a mixture thereof with a reducing agent which does not contain carbon atoms, can be used it can be it is or as diluted. When the mixture is used, the mixing ratio of the reducing-and-carburizing agent containing carbon atoms to the reducing agent which does not contain carbon atoms is suitably selected but is preferably up to 1 to 5 by volume. Contact conditions are also suitably selected but the preferred contacting temperature is about 250° to about 400° C., more preferably about 300° to about 400° C. The preferred contacting time is about 0.5 to 6 hours when the contact in (a) is conducted, and about 1 to about 12 hours when the contact in (a) is not conducted. The preferred gas flow rate (excluding diluent) is about 1 to about 1000 ml S.T.P./min per gram of the starting iron compound. The contacting pressure inclusive of that of the diluent is usually 1 to 2 atm. although not particularly limitative.

The particles obtained by the present invention are in the form of generally uniform particles when observed under an electron microscope. The particles are present as primary acicular particles and have the same particulate form as the particles of the starting iron compound. The particles obtained by the process are found to contain carbon by elementary analysis and to contain an iron carbide by its X-ray diffraction pattern, which exhibits plane spacings at 2.28 Å, 2.20 Å, 2.08 Å, 2.05 Å and 1.92 Å. Such pattern corresponds to $Fe_5C_2$. The iron carbide component of the present invention chiefly comprises $Fe_5C_2$, with $Fe_2C$, $Fe_{20}C_9$ ($Fe_{2.2}C$), $Fe_3C$, $Fe_7C_3$, etc. present conjointly therewith in some cases. It is suitable to represent the iron carbide as $Fe_xC$ ($2 \leq x < 3$).

The iron carbide fine particles of the present invention are useful as a magnetic material for magnetic recording as is apparent from the foregoing characteristics, etc., while the use thereof is not limited thereto. For example, the particulate material is usable as a catalyst for preparing lower aliphatic hydrocarbons from CO and $H_2$.

Further, the present iron carbide fine particles are useful as a starting material for producing fine metal iron particles containing carbon.

In the present invention, it is possible to produce fine iron carbide particles which have a low deposition of free carbon on the particles and have high saturation magnetization.

The invention will be described below in detail by showing reference examples, examples and comparison examples.

In the following examples, characteristics, etc. are determined by the methods described below.

(1) Magnetic Characteristics.

Determined by the following method unless otherwise specified.

Coercive force (Hc, Oe), saturation magnetization ($\sigma$s, e.m.u./g) and square ratio (Sq) are measured in a magnetic field with a strength of 5 kOe, using a gauss meter equipped with a Hall-effect element and the powder sample with a packing ratio of 0.2.

(2) Elementary Analysis for C, H and N

The sample is subjected to elementary analysis by the conventional method using MT2 CHN CORDER Yanaco, Yanagimoto Mfg. Co., Ltd, with passage of oxygen (helium carrier) at 900° C.

REFERENCE EXAMPLES 1 TO 4 AND 11 TO 14

Sixteen grams (14.4 g in terms of $Fe_2O_3$) of goethite particles, 0.4 $\mu$m in average particle size and 10 in average axial ratio, were dispersed in 0.6 l of pure water. The dispersion was adjusted to pH 3 with an aqueous solution of 1N-HCl and thereto was added an aqueous solution obtained by dissolving a specific amount of the metal compound listed in Table 1 in 10 ml of pure water. The mixture was stirred and adjusted to pH 8.5 with 0.2N-NaOH to perform the coating of the metal compound.

Finally, the particles were filtered from the dispersion, washed with water, dried and pulverized in a mortar to obtain goethite particles coated with the metal compounds.

Although a combination of iron compound, cobalt compound and silicon compound is not shown in Table 1, silicon compound and aluminum compound are alternatively used and a silicon compound can be used in place of an aluminum compound with the same effect.

REFERENCE EXAMPLES 5 AND 15

The same amount of the goethite particles used in Reference Example 1 were dispersed in the same manner as in Reference Example 1. Similarly, to the dispersion was added an aqueous solution obtained by dissolving a specific amount of the firstly coated metal compound listed in Table 2 in 10 ml of pure water. The metal compound was similarly coated on the goethite particles.

The dispersion was adjusted to pH 10.5 with an aqueous solution of 1N-NaOH and thereto was added an aqueous solution obtained by dissolving a specific amount of the secondly coated metal compound listed in Table 2 in 10 ml of pure water. The mixture was stirred and adjusted to pH 8.5 with 0.2N-HCl to perform the coating of the metal compound.

Finally, in the same manner as in Reference Example 1 were obtained goethite particles coated firstly with the metal compounds and secondly with silicon compound or aluminum compound.

REFERENCE EXAMPLES 21 TO 25 AND 31 TO 35

The goethite particles obtained in each of Reference Examples were heated and dehydrated in air at 350° C. for 60 minutes to obtain $\alpha$-$Fe_2O_3$ particles coated with compounds shown in Tables 1 and 2.

EXAMPLES AND COMPARISON EXAMPLES

Two grams of each of $\alpha$-$Fe_2O_3$ particles obtained in Reference Examples were contacted with CO at 365° C. for 3.5 hours at a flow rate of 200 ml/min. The particles were thereafter allowed to cool to room temperature to obtain a black powder. The resulting iron carbide was analyzed qualitatively and quantitatively by X-ray diffraction pattern of the product. In the qualitative analysis, $Fe_5C_2$ was detected by the peaks having plane spacings at 2.05 Å, 2.08 Å and 2.20 Å, and $Fe_7C_3$ was detected by the peaks having plane spacings at 2.02 Å, 2.12 Å and 2.26 Å (plane spacings having high intensity were selected in $Fe_5C_2$ Iron Carbide on ASTM X-Ray Powder Data File 20-509 and $Fe_7C_3$ Iron Carbide on ASTM X-Ray Powder Data File 17-333). In the quantitative analysis, ratio of $Fe_5C_2$ and $Fe_7C_3$ was measured from ratio of their intensity in 2.05 Å and 2.02 Å respectively. Table 3 gives magnetic characteristics and the results of the analysis.

As apparent from Table 3, the iron carbide fine particles of Example 1 obtained from the starting iron compound coated with iron compound have a small amount of free carbon, and the iron carbide fine particles of Examples 2 to 4 obtained from the starting iron compound coated with both of iron compound and cobalt compound have a small amount of free carbon and are excellent in coercive force and saturation magnetization.

Although iron carbide fine particles of Comparison Example 4 are small in free carbon and large in saturation magnetization, the particles deform in shape by sintering and are low in orientation and remanent flux density when made into a magnetic tape.

TABLE 1

| Ref. Ex. | Metal compound [metal content (wt %)] | Amount (g) [in terms of element] |
| --- | --- | --- |
| 1 | $Fe_2(SO_4)_3.nH_2O$ | 0.477 |
|   | (Fe 16.76) | (0.080) |
|   | $Al_2(SO_4)_3.nH_2O$ | 0.224 |
|   | (Al 10.72) | (0.024) |
| 2 | $Fe_2(SO_4)_3.nH_2O$ | 0.239 |
|   | (Fe 16.76) | (0.040) |
|   | $CoSO_4.7H_2O$ | 0.191 |
|   | (Co 20.96) | (0.040) |
|   | $Al_2(SO_4)_3.nH_2O$ | 0.224 |
|   | (Al 10.72) | (0.024) |
| 3 | $Fe_2(SO_4)_3.nH_2O$ | 0.239 |
|   | (Fe 16.76) | (0.040) |
|   | $CoSO_4.7H_2O$ | 0.191 |
|   | (Co 20.96) | (0.040) |
|   | $Al_2(SO_4)_3.nH_2O$ | 0.149 |
|   | (Al 10.72) | (0.016) |
| 4 | $Fe_2(SO_4)_3.nH_2O$ | 0.239 |
|   | (Fe 16.76) | (0.040) |
|   | $CoSO_4.7H_2O$ | 0.191 |
|   | (Co 20.96) | (0.040) |
|   | $Al_2(SO_4)_3.nH_2O$ | 0.075 |
|   | (Al 10.72) | (0.008) |
| 11 | $Al_2(SO_4)_3.nH_2O$ | 0.448 |
|   | (Al 10.72) | (0.048) |
| 12 | $CoSO_4.7H_2O$ | 0.382 |
|   | (Co 20.96) | (0.080) |
|   | $Al_2(SO_4)_3.nH_2O$ | 0.224 |

TABLE 1-continued

| Ref. Ex. | Metal compound [metal content (wt %)] | Amount (g) [in terms of element] |
|---|---|---|
|  | (Al 10.72) | (0.024) |
| 13 | NiSO$_4$.7H$_2$O | 0.383 |
|  | (Ni 20.91) | (0.080) |
|  | Al$_2$(SO$_4$)$_3$.nH$_2$O | 0.224 |
|  | (Al 10.72) | (0.024) |
| 14 | CoSO$_4$.7H$_2$O | 0.382 |
|  | (Co 20.96) | (0.080) |

TABLE 2

| Ref. Ex. | Firstly coated metal compound | | Secondly coated compound | |
|---|---|---|---|---|
|  | kind | amount (g) | kind | amount (g) |
| 5 | Fe$_2$(SO$_4$)$_3$.nH$_2$O |  | water glass No. 3 [Na$_2$O.nSiO$_2$(n = 2~4)] |  |
|  | (Fe 16.76) | 0.477 | (SiO$_2$ 29) | 0.177 |
| 15 | CoSO$_4$.7H$_2$O |  | water glass No. 3 |  |
|  | (Co 20.96) | 0.382 | (SiO$_2$ 29) | 0.177 |

TABLE 3

| Ex. or Com. Ex. | Starting material | Process | Coated metal | Coated amount (wt %) | Hc (Oe) | $\sigma$s (emu/g) | Free C | Sq | Fe$_5$C$_2$/Fe$_7$C$_3$ (intersity ratio) |
|---|---|---|---|---|---|---|---|---|---|
| Ex. 1 | Ref. Ex. 1 | Ref. Ex. 21 | Fe/Al | 0.5/0.15 | 860 | 94.3 | 1.82 | 0.51 | 40/60 |
| Ex. 2 | Ref. Ex. 2 | Ref. Ex. 22 | Fe/Co/Al | 0.25/0.25/0.15 | 970 | 90.7 | 1.68 | 0.54 | 100/0 |
| Ex. 3 | Ref. Ex. 3 | Ref. Ex. 23 | Fe/Co/Al | 0.25/0.25/0.1 | 970 | 91.8 | 1.51 | 0.54 | 100/0 |
| Ex. 4 | Ref. Ex. 4 | Ref. Ex. 24 | Fe/Co/Al | 0.25/0.25/0.05 | 980 | 92.9 | 1.85 | 0.54 | 100/0 |
| Ex. 5 | Ref. Ex. 5 | Ref. Ex. 25 | Fe//Si | 0.5//0.15 | 830 | 95.2 | 2.41 | 0.50 | 35/65 |
| Com. Ex. 1 | Ref. Ex. 11 | Ref. Ex. 31 | Al | 0.3 | 860 | 88.3 | 4.42 | 0.50 | 40/60 |
| Com. Ex. 2 | Ref. Ex. 12 | Ref. Ex. 32 | Co/Al | 0.5/0.15 | 1000 | 88.1 | 3.63 | 0.53 | 100/0 |
| Com. Ex. 3 | Ref. Ex. 13 | Ref. Ex. 33 | Ni/Al | 0.5/0.15 | 995 | 87.5 | 4.08 | 0.53 | 100/0 |
| Com. Ex. 4 | Ref. Ex. 14 | Ref. Ex. 34 | Co | 0.5 | 990 | 92.5 | 1.49 | 0.53 | 100/0 |
| Com. Ex. 5 | Ref. Ex. 15 | Ref. Ex. 35 | Co//Si | 0.5//0.15 | 970 | 90.1 | 2.86 | 0.53 | 100/0 |

(Note)
/: co-precipitation
//: dual-layer structure

We claim:

1. A process of preparing iron carbide fine particles having an average particle size (long axis) of 0.1 to 2 μm, and an average axial ratio of 3 to 20, comprising:

(a) coating a first iron compound selected from at least one of iron oxide particles and iron oxyhydroxide particles with a first coating composition comprising a second iron compound, which is different from said iron oxide or iron oxyhydroxide, and further with a second coating composition selected from at least one of an aluminum compound or silicon compound to form a coated iron containing composition;

(b) reducing said coated iron containing composition with at least one reducing agent which does not contain carbon atoms; and (c) contacting the product of said reducing step (b) with a reducing and carburizing agent comprising at least one compound which contains at least one carbon atom.

2. A process of preparing iron carbide fine particles having an average particle size (long axis) of 0.1 to 2 μm, and an average axial ratio of 3 to 20, comprising:

(a) coating a first iron compound selected from at least one of iron oxide particles and iron oxyhydroxide particles with a first coating composition comprising a second iron compound, which is different from said iron oxide or iron oxyhydroxide, and further with a second coating composition selected from at least one of an aluminum compound or silicon compound to form a coated iron containing composition; and (b) contacting the product of said coating step (a) with a coating and carburizing agent comprising at least one compound which contains at least one carbon atom.

3. A process as claimed in claim 1 or 2 wherein said first coating composition comprises said second iron compound and a cobalt compound.

4. A process as claimed in claim 1, wherein said reducing and carburizing agent comprises a mixture comprising a compound containing at least one carbon atom and a compound which does not contain any carbon atoms.

5. A process as claimed in claim 1 or 2 wherein said second iron compound is at least one member selected from the group consisting of iron chloride, iron nitrate, and iron sulfate.

6. A process as claimed in claim 3 wherein said cobalt compound is at least one member selected from the group consisting of cobalt chloride, cobalt nitrate, and cobalt sulfate.

7. A process as claimed in claim 1 or 2 wherein said aluminum compound is at least one member selected from the group consisting of aluminum sulfate, aluminum nitrate, aluminum chloride, alum, sodium aluminate, and potassium aluminate.

8. A process as claimed in claim 1 or 2 wherein said silicon compound is at least one member selected from the group consisting of sodium orthosilicate, sodium metasilicate, and potassium metasilicate.

9. A process as claimed in claim 2 wherein said second iron compound is at least one member selected from the group consisting of iron chloride, iron nitrate, and iron sulfate; said aluminum compound is at least one member selected from the group consisting of aluminum sulfate, aluminum nitrate, aluminum chloride, alum, sodium aluminate, and potassium aluminate; and said silicon compound is at least one member selected from the group consisting of sodium orthosilicate, sodium metasilicate, and potassium metasilicate.

10. A process as claimed in claim 1 wherein said second iron compound is at least one member selected from the group consisting of iron chloride, iron nitrate, and iron sulfate; said aluminum compound is at least one member selected from the group consisting of aluminum sulfate, aluminum nitrate, aluminum chloride, alum, sodium aluminate, and potassium aluminate; and said silicon compound is at least one member selected from the group consisting of sodium orthosilicate, sodium metasilicate, and potassium metasilicate.

11. A process as claimed in claim 2 wherein said second iron compound is at least one member selected from the group consisting of iron chloride, iron nitrate, and iron sulfate.

12. A process as defined in claim 1 or 2 wherein the coated iron compound in the step (a) is heated at about 200° to 700° C.

13. A process as defined in claim 1 or 2 wherein the contacting temperature in the step (a) is about 200° to 700° C. and contacting in the step (b) is about 250° to 400° C.

14. A process as defined in claim 1 or 2 wherein the amount of coating of each compound in the step (a) is 0.01 to 10% by weight in terms of the metal element of said compound based on the weight of the iron oxyhydroxide or iron oxide in terms of $Fe_2O_3$.

* * * * *